Patented June 27, 1950

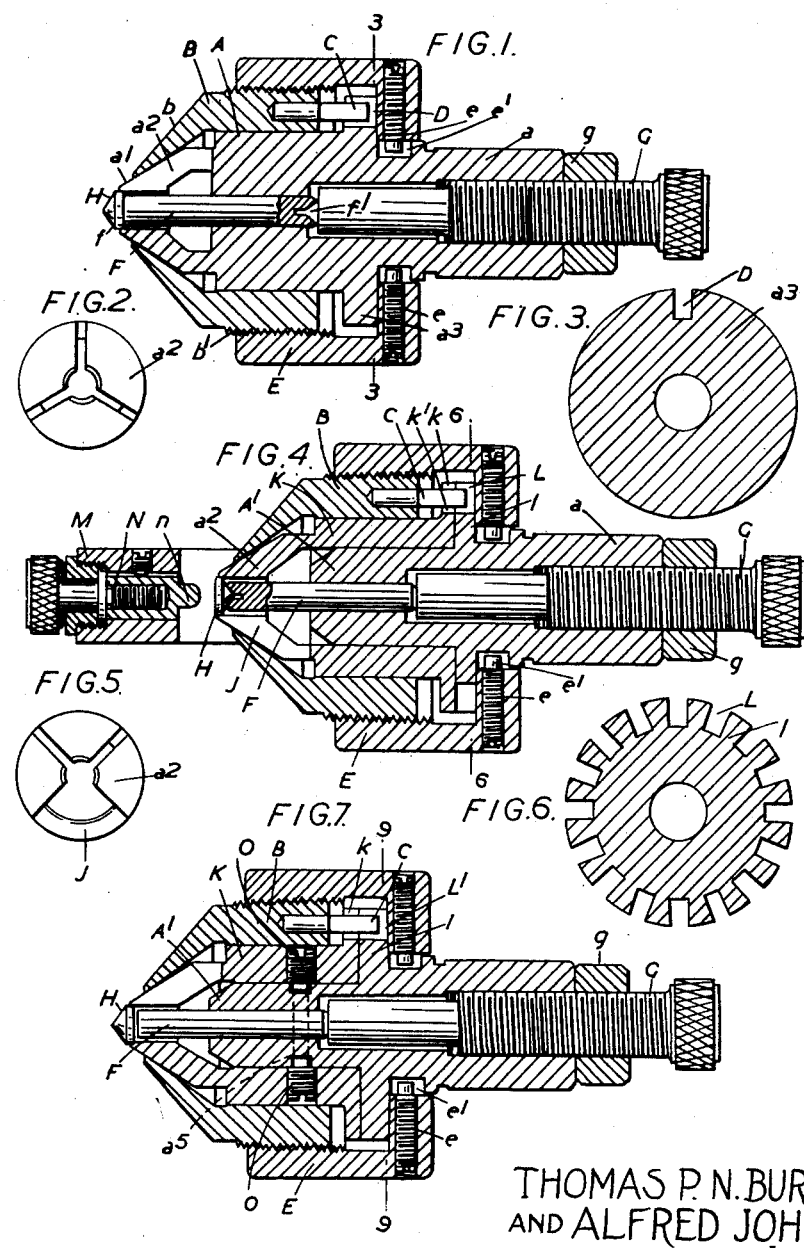

2,513,139

UNITED STATES PATENT OFFICE 2,513,139

MECHANICAL GRIPPER FOR DIAMONDS

Thomas P. N. Burness and Alfred Johnson,
Halifax, England

Application July 30, 1947, Serial No. 764,859
In Great Britain September 14, 1942

5 Claims. (Cl. 51—229)

This invention relates to a dop or work holder provided with mechanically actuated gripping jaws for gripping the girdle of a diamond or other hard substance hereinafter referred to as diamond which has previously been made circular and cylindrical or very nearly so, the said gripping jaws being adapted to be held truly by a socket in which the body portion of the dop or work holder fits and is rotatable about a longitudinal axis and capable of being set in various angular positions about a transverse axis and provided with facet indexing and grain setting appliances in order that the facets on the table side and collette of the diamond can be ground and polished.

The present invention has for its object to produce a dop or work holder provided with mechanically actuated gripping jaws which will be truly co-axial with the socket and remain truly co-axial during all its adjustments and preserve such accuracy throughout a long period, to enable the same jaws to be used for holding the diamond whilst cutting the table and the facets on the table side and also whilst cutting the facets on the collette, enable the facets on either side of the diamond to be ground either by providing a vacant space in the jaws to allow a portion of the diamond to come in contact with the lap when grinding a facet or by using jaws without a vacant space in which case the necessity for turning the jaws in relation to the diamond to bring the vacant space opposite to the lap each time the diamond is turned to a position from grinding another facet is avoided with the result that all the facets on the table side can be cut without disturbing the position of the jaws and all the facets on the collette can in like manner be cut without disturbing the position of the jaws. The invention also has for its object to enable different jaws and attendant fittings appertaining to the gripping device to be substituted for holding diamonds of different diameters.

In the accompanying drawings—

Fig. 1 is a section taken through a dop or work holder provided with mechanically actuated gripping jaws constructed in accordance with this invention.

Fig. 2 is an end view of the gripping jaws.

Fig. 3 is a section taken through the body portion of the dop or work holder on line 3—3 on Fig. 1.

Figs. 4, 5 and 6 are similar views to Figs. 1, 2 and 3 showing a modified construction and Fig. 7 is also a similar view to those appearing in Figs. 1, 2 and 3 showing a preferred construction.

Referring to Figs. 1, 2 and 3, A indicates the body part of the dop or work holder which consists of an accurately finished tubular cylinder one portion $a$ of which constitutes a shank that is adapted to fit a truly running socket formed in the holder (not shown). The body part A terminates at its front end in an accurately finished cone $a^1$ that is slit to form three jaws $a^2$ as shown in Fig. 2. Slidably and non-rotatably mounted on the body part or member A is a sleeve B that terminates at its front end in a hollow cone $b$ that is adapted to engage the conical surface $a^1$ of the gripping jaws in proximity to their gripping ends. Extending rearwardly from the sleeve B is a peg C that engages a radial slot D formed in a flange $a^3$ that extends around the body part A. The sleeve B is threaded externally at $b^1$ to engage a union nut E that is fitted with screws $e$ that enter an annular groove $e^1$ formed in a portion of the body part behind the flange $a^3$. The groove $e^1$ is sufficiently wide to allow a certain amount of endwise movement of the nut E to take place. Slidably mounted in the body part or member A is a depth peg F one end of which is formed with a plane surface $f$ at right angles to its axis and the other end is formed with a countersink $f^1$. G indicates an adjusting screw that engages a tapped hole in the shank portion $a$ of the body part and $g$ indicates a lock nut for securing the adjusting screw in any adjusted position.

In the construction described the diamond H is inserted in the gripping jaws and set to depth by the depth peg and adjusting screw the end of the depth peg in the example shown constituting a support for the table end of the diamond. The nut E is then turned to draw the externally threaded sleeve B along the body part A and cause its truly finished internal cone to bear on the truly finished external cone $a^1$ thereby contracting the jaws $a^2$ upon the girdle of the diamond with the result that the latter is gripped in a position that is truly central, and co-axial with the axis of the socket (not shown). When the facets at the table side of the diamond are to be ground the depth peg F is reversed and the countersink $f^1$ used as a locating surface for the collette side of the diamond the collette being pressed into such countersink and secured in position by the gripping jaws in the manner previously described after it has been adjusted for depth by the screw.

In the construction shown in Figs. 4 to 6 which are more particularly applicable for facilitating the grinding of the facets on the table side of the diamond a vacant space J is provided in the gripper jaws $a^2$ to allow the portion of the diamond H to be ground to contact with the lap (not shown) and in order that this vacant space can be brought into position after the diamond has been adjusted for facet cutting, the gripping jaws $a^2$ are formed on one end of an inner sleeve K which has a flange K' extending around its other end and forms an accurate fit upon an accurately finished tubular cylinder $A^1$ which forms the front end of the body part.

Slidably mounted on the inner sleeve K is the externally threaded outer sleeve B and extending from the rear end of such sleeve is the peg C which in this case passes through a radial slot $k$ in the flange $k^1$ and through one or other of a number of radial slots L in a flange $l$ that extends around the body part an externally threaded sleeve B being engaged by a nut E in the manner previously described. By slackening this nut to a sufficient extent, the peg C can be withdrawn from its slot L in the multiple slotted flange and the sleeve K turned to bring the vacant space J directly over the lap after each indexing or facet setting operation. Before the nut is slackened and the sleeve turned to bring the vacant space into position a pivoted member M fitted with an adjusting screw N that engages a plunger $n$ that is slidably and non-rotatably mounted in the pivoted member M is brought into a position that will bring the end of the plunger co-axial with the table end of the diamond H as shown in Fig. 4 and the screw N adjusted to cause the plunger end to bear on the table side of the diamond and hold the latter upon its conical seat in the depth peg during the turning of the gripping jaws $a^2$ from one position to another. When the vacant space J has been brought into position which may be located by an indication mark or a locating device, the nut E is adjusted to clamp all the parts in position with the peg C in the radially slotted flange $l$ and the jaws gripping the girdle after which the adjusting screw N on the pivoted member M is slackened and the latter moved to its inoperative position.

In the preferred construction shown in Fig. 7, which eliminates the vacant space in the gripping jaws the construction is the same as the one last described with the exception that the inner gripping sleeve K is prevented from being moved in an endwise direction upon the front end $A^1$ of the body part or member by screws O engaging an annular groove $a^5$ in the part $A^1$ and the flange $l$ that extends around the intermediate portion of the tubular cylinder is formed with only one slot $L^1$, the peg C that extends from the rear end of the externally threaded outer sleeve B always occupying a position in the radial slot $k$ in the gripping sleeve and the radical slot $L^1$ in the flange $l$.

By dispensing with the necessity for turning the gripping jaws $a^2$ on the tubular cylinder K to bring the vacant space in the jaws opposite to the lap during the grinding of the various facets, the tendency of the diamond to alter its position during the resetting of the jaws is eliminated.

To adapt the dop or work holder for gripping different diameters of diamonds, all that is necessary is to substitute gripping jaws and a contracting sleeve and a depth peg to suit the different size of diamond.

In all the constructions described the centering and gripping of the diamond is governed by plane cylindrical locating surfaces and no relative rotary motion takes place between the contracting sleeve and the gripping jaws. The contracting motion takes place in a direction that is parallel to the axis of the holder.

What we claim as our invention and desire to secure by Letters Patent of the United States is:

1. In a dop or work holder of the type provided with mechanically operated gripping jaws for gripping the girdle of a diamond or other gem, the combination of a body member consisting of an accurately finished tubular cylinder; the the gripping jaws being disposed at one end of the latter and each individually having a partial external conical surface; a sleeve encircling the body member and having a forwardly extending conical portion for engaging with the partial external conical surfaces of the gripping jaws in the vicinity of the outer gripping ends thereof, said sleeve having an internal cylindrical portion axially slidable upon said body member; a flange fixed upon the latter member; means movably encircling said body member and bearing against the flange in order to draw said sleeve in effective axial direction to force the conical portion thereof to engage with the partial external conical surfaces of said gripping jaws for tightening the latter on the diamond, the body member having a tapped longitudinal hole therein; a depth peg slidably mounted in said body member; and an adjusting screw adjustably engaging in the thread in the tapped hole in said body member and extending into effective position to bear against one end of the depth peg in order to set said depth peg on said diamond.

2. In a dop or work holder of the type provided with mechanically operated gripping jaws for gripping the girdle of a diamond or other gem, the combination of a body member consisting of an accurately finished tubular cylinder; the gripping jaws being disposed at one end of the latter and each individually having a partial external conical surface; a sleeve encircling the body member and having a forwardly extending conical portion for engaging with the partial external conical surfaces of the gripping jaws in the vicinity of the outer gripping ends thereof, said sleeve having an internal cylindrical portion axially slidable upon said body member; a flange fixed upon the latter member; means movably encircling said body member and bearing against the flange in order to draw said sleeve in effective axial direction to force the conical portion thereof to engage with the partial external conical surfaces of said gripping jaws for tightening the latter on the diamond, the body member having a tapped central axial hole therein; a depth peg slidably mounted in the axial hole in said body member with a plane surface on one end thereof for supporting the table side of the diamond and a counter sunk portion in the opposite end for supporting the collet side of said diamond; an adjusting screw adjustably engaging in the thread of said axial hole and extending into effective position to bear against one end of the depth peg in order to set said depth peg on the diamond; and a lock nut movable on said adjusting screw and bearing against said body member for fixing said depth peg in attained set position.

3. In a dop or work holder of the type provided with mechanically operated gripping jaws for gripping the girdle of a diamond or other gem, the combination of a body member consisting of an accurately finished tubular cylinder; the gripping jaws being disposed at one end of the latter and each individually having a partial external conical surface; a first sleeve detachably mounted thereon and having a reduced conical portion upon the forward end thereof, the reduced conical portion of the first sleeve having slits forming gripping jaws; an accurately fitting externally threaded second sleeve slidably mounted on the first sleeve and having a hollow conical forward end for engaging with the conical portion of the first sleeve in the vicinity of the gripping ends of the gripping jaws; a flange fixed on the body member forming a rigid rear stop for the first sleeve; a nut fitted on the external thread of the second sleeve and having a predetermined range of axial movement on said body member, the latter having an axial hole which is tapped in one portion thereof; a depth peg slidably mounted in the hole of said body member; an adjusting screw engaging in the tapped portion of said axial hole with the end thereof engaging against one end of the depth peg for setting the latter on the diamond; and a lock nut mounted on said adjusting screw for fixing said depth peg in attained set position.

4. In a dop or work holder of the type provided with mechanically operated gripping jaws for gripping the girdle of a diamond or other gem, the combination of a body member consisting of an accurately finished tubular cylinder; the gripping jaws being disposed at one end of the latter and each individually having a partial external conical surface; an inner sleeve detachably mounted thereon and having a reduced conical portion of the inner sleeve having slits forming said conical portion into a group of gripping jaws; an accurately finished externally threaded outer sleeve slidably mounted on the inner sleeve and having a hollow conical forward end for engaging with the conical portion of the inner sleeve in the vicinity of the gripping ends of the gripping jaws; a flange fixed on the body member forming a rear stop for the inner sleeve; a nut fitted on the external thread of the outer sleeve and having a predetermined range of axial movement on said body member, the latter having a longitudinal hole which is tapped in one portion thereof; means for preventing forward displacement of said inner sleeve from said flange; a depth peg slidably mounted in the longitudinal hole in said body member; an adjusting screw engaging in the tapped portion of said longitudinal hole with the end thereof engaging against one end of the depth peg for setting the latter on the diamond; and a locknut mounted on said adjusting screw and bearing against said body member for fixing said depth peg in attained set position.

5. In a dop or work holder of the type provided with mechanically operated gripping jaws for gripping the girdle of a diamond or other gem, the combination of a body member consisting of an accurately finished tubular cylinder; the gripping jaws being disposed at one end of the latter and each individually having a partial external conical surface; an inner sleeve detachably mounted thereon and having a reduced conical portion upon the forward end thereof, the reduced conical portion of the inner sleeve having slits forming said conical portion into a group of gripping jaws; an accurately finished externally threaded outer sleeve slidably mounted on the inner sleeve and having a hollow conical forward end for engaging with the conical portion of the inner sleeve in the vicinity of the gripping ends of the gripping jaws; a flange fixed on the body member forming a rear stop for the inner sleeve; a nut fitted on the external thread of the outer sleeve and having a predetermined range of axial movement on said body member, the latter having a longitudinal hole which is tapped in one portion thereof; means for preventing forward displacement of said inner sleeve from said flange; a short reversible depth peg slidably mounted in the longitudinal hole in said body member with a plane surface on one end thereof for supporting the table side of the diamond and a countersunk portion in the opposite end for supporting the collet side of said diamond; and a locknut mounted on said adjusting screw and bearing against said body member for fixing said depth peg in attained set position.

T. P. N. BURNESS.
ALFRED JOHNSON.

REFERENCES CITED

The following references are of record in the file of this patent:

UNITED STATES PATENTS

| Number | Name | Date |
|---|---|---|
| 2,270,420 | Dinhofer | Jan. 20, 1942 |
| 2,391,550 | Cope | Dec. 25, 1945 |
| 2,393,939 | Spira | Jan. 29, 1946 |
| 2,429,961 | Rakowitzky | Oct. 28, 1947 |

FOREIGN PATENTS

| Number | Country | Date |
|---|---|---|
| 541,451 | Great Britain | Nov. 27, 1941 |